United States Patent [19]

Streeter et al.

[11] Patent Number: 5,791,003
[45] Date of Patent: Aug. 11, 1998

[54] METHOD AND APPARATUS FOR VARIABLY ELEVATING A PASSENGER BOARDING BRIDGE PLATFORM

[75] Inventors: Raymond K. Streeter, Arlington; William H. Young, Fort Worth, both of Tex.

[73] Assignee: Trinity Industries, Inc., Dallas, Tex.

[21] Appl. No.: 666,841

[22] Filed: Jun. 19, 1996

[51] Int. Cl.$^6$ .................................................. B64D 9/00
[52] U.S. Cl. .................................................. 14/71.5; 14/71.7
[58] Field of Search .................................. 14/71.5, 71.3, 14/71.1, 71.2, 72.5, 71.7; 114/362

[56] References Cited

U.S. PATENT DOCUMENTS

| | | |
|---|---|---|
| 2,581,293 | 1/1952 | Read et al. |
| 2,688,761 | 9/1954 | Good et al. |
| 2,700,169 | 1/1955 | Henion |
| 2,875,457 | 3/1959 | Read et al. |
| 3,038,185 | 6/1962 | Moore |
| 3,046,908 | 7/1962 | Der Yuen |
| 3,047,891 | 8/1962 | Golde et al. |
| 3,060,471 | 10/1962 | Der Yuen et al. |
| 3,086,152 | 4/1963 | Lodjic et al. |
| 3,099,847 | 8/1963 | Lodjic et al. |
| 3,110,048 | 11/1963 | Bolton |
| 3,121,243 | 2/1964 | Phillips |
| 3,123,167 | 3/1964 | Lichti |
| 3,184,772 | 5/1965 | Moore et al. |
| 3,263,253 | 8/1966 | Wollard et al. |
| 3,263,254 | 8/1966 | Wollard et al. |
| 3,310,823 | 3/1967 | Preiss |
| 3,315,291 | 4/1967 | Wollard et al. |
| 3,317,942 | 5/1967 | Wollard et al. |
| 3,341,875 | 9/1967 | Wollard et al. |
| 3,369,264 | 2/1968 | Kurka et al. |
| 3,377,638 | 4/1968 | Seipos |
| 3,378,868 | 4/1968 | Wollard et al. |
| 3,391,416 | 7/1968 | Riggles, Jr. |
| 3,402,412 | 9/1968 | Seipos |
| 3,404,417 | 10/1968 | Wollard et al. |
| 3,412,412 | 11/1968 | Kjerulf et al. |
| 3,422,477 | 1/1969 | Riggles, Jr. |
| 3,462,784 | 8/1969 | Seipos |
| 3,462,787 | 8/1969 | Seipos |
| 3,543,318 | 12/1970 | Tushim |
| 3,561,030 | 2/1971 | Seipos |
| 3,599,262 | 8/1971 | Carder et al. |
| 3,665,536 | 5/1972 | Jackson ........................ 14/71 |
| 3,694,724 | 9/1972 | Eggert, Jr. .................... 318/648 |
| 3,875,603 | 4/1975 | Mampaey ...................... 14/71 |
| 4,161,049 | 7/1979 | Saunders et al. ............. 14/71.5 |
| 4,222,140 | 9/1980 | Olewinski et al. ........... 14/71.3 |
| 4,333,194 | 6/1982 | Drozd ........................... 14/71.5 |
| 4,366,591 | 1/1983 | Zimmerman ................. 14/71.3 |
| 4,369,538 | 1/1983 | Smedal ......................... 14/69.5 |
| 4,473,916 | 10/1984 | Connold ....................... 14/42 |
| 4,559,660 | 12/1985 | Lichti ........................... 14/71.5 |
| 4,852,197 | 8/1989 | Thomas, Jr. ................. 14/71.5 |
| 4,984,321 | 1/1991 | Larson |
| 5,004,188 | 4/1991 | Donneky et al. |
| 5,084,936 | 2/1992 | Thomas, Jr. |
| 5,105,495 | 4/1992 | Larson et al. |
| 5,226,204 | 7/1993 | Schoenberger et al. |
| 5,257,431 | 11/1993 | Larson et al. |
| 5,267,368 | 12/1993 | Saunders |
| 5,328,252 | 7/1994 | Thompson |
| 5,359,746 | 11/1994 | Kane et al. |

*Primary Examiner*—James Lisehora
*Attorney, Agent, or Firm*—Baker & Botts, L.L.P.

[57] ABSTRACT

An apparatus for variably elevating passenger boarding bridge platforms includes a tunnel (11) having a pivoting end (21) adjacent a fixed platform (7) and a free end (52) adjacent a variable platform (42). The tunnel has a ceiling (15) and a floor (13). The apparatus also includes a lift (102a, 102b, 103a, 103b) for raising and lowering the tunnel (11). The free end (52) of the tunnel is moved vertically by a tilt mechanism (104a, 104b), which has two ends. A cradle (10) is connected to the lift (102a, 102b) and to one end of the tilt mechanism. The apparatus also include a guide structure (14a, 14b) aligning the cradle and a plurality of guidepads (502a, 502b) adjacent the guide structure (14a, 14b) fixed to the tunnel solely at the ceiling (15) for aligning the tunnel (11), leaving the floor (13) to move freely with respect to the guide structure (14a, 14b).

13 Claims, 5 Drawing Sheets

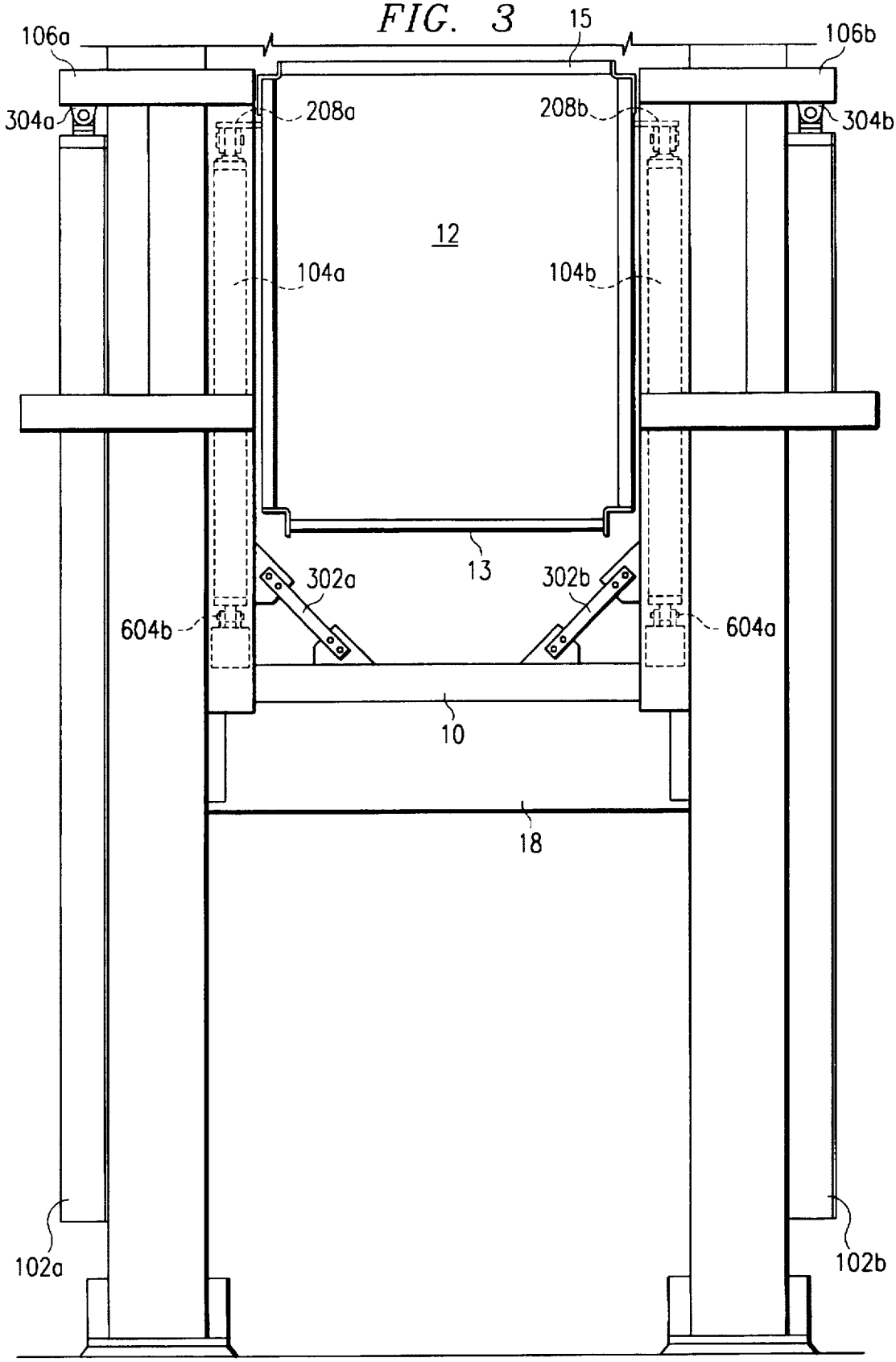

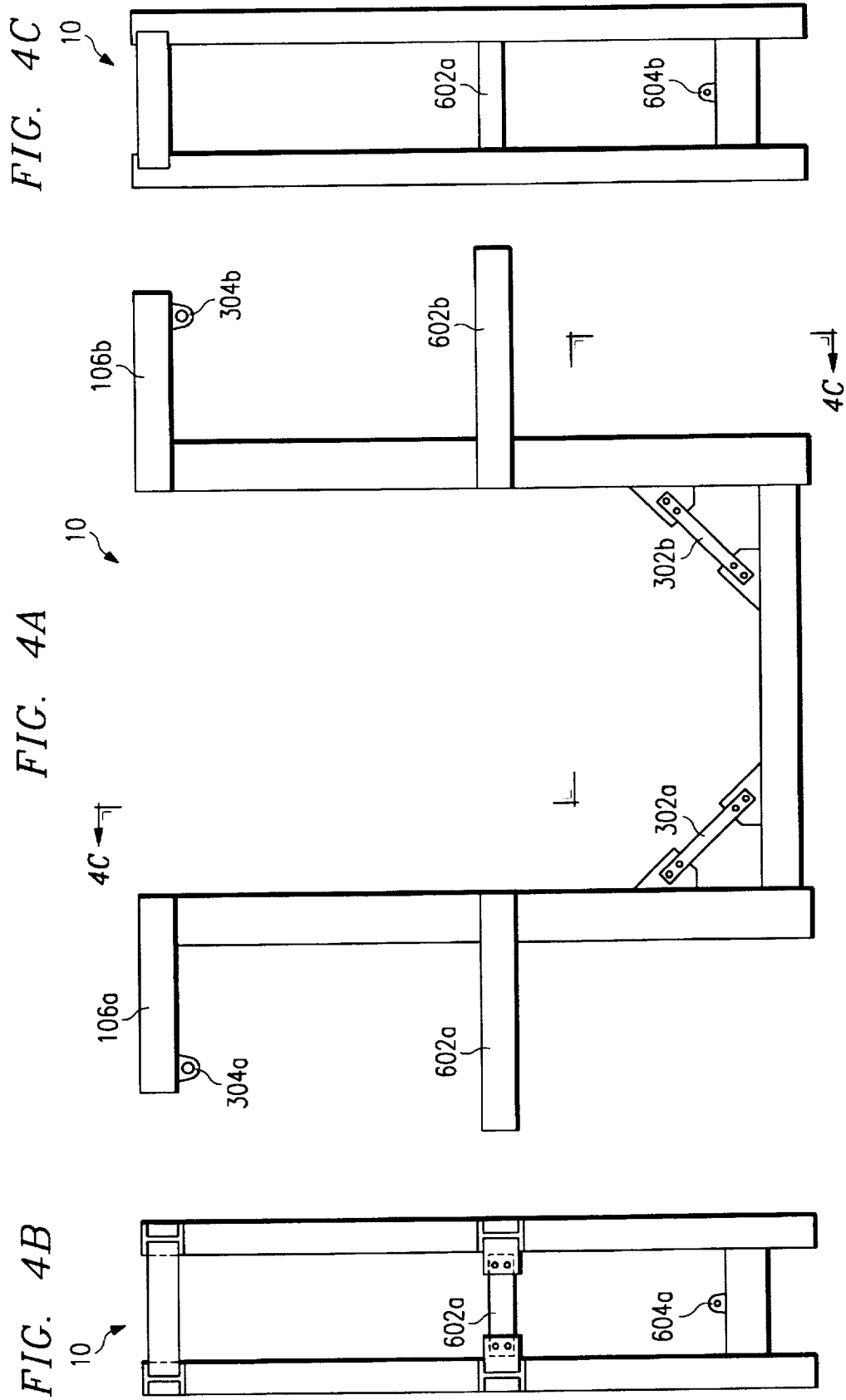

5,791,003

METHOD AND APPARATUS FOR VARIABLY ELEVATING A PASSENGER BOARDING BRIDGE PLATFORM

TECHNICAL FIELD OF THE INVENTION

This invention relates generally to the field of passenger boarding bridges and more particularly to a method and apparatus for variably elevating a passenger boarding bridge platform.

BACKGROUND OF THE INVENTION

Passenger boarding bridges have numerous applications such as connecting an airplane or ship to a terminal. In an effort to overcome this problem, one prior approach utilizes a passenger boarding bridge that may be elevated and tilted. In that approach, a passenger boarding bridge includes a lift for raising and lowering a tunnel and a tilt mechanism, which includes hydraulic tilt cylinders, for tilting the tunnel. The tunnel has a floor and a ceiling. The tilt mechanism adjusts the elevation of a cradle that is connected to one end of the tunnel in order to elevate or tilt the tunnel. The passenger boarding bridge also includes a guide structure and a plurality of guidepads for aligning the cradle. The plurality of guidepads are fixed to the tunnel near the ceiling and near the floor. One disadvantage to this approach is that the alignment of the tunnel by the guidepads is affected by movement of the hydraulic tilt cylinders. In a conventional application, a boarding bridge consists of a tunnel that connects a platform of fixed height, such as an airplane or ship terminal, to a platform of variable height, such as the deck of a ship or the inside of an airplane. In many instances the height of the fixed platform is different than the height of the variable platform. To accommodate these height differences the boarding bridges will be sloped. A problem with conventional bridges is they require excessively long lengths to maintain an acceptable grade or slope of the bridge. Typical slope limits are approximately 10%. Therefore, a 100 foot bridge is required to accommodate a 10 foot elevation difference between the fixed platform and the variable platform. Such distances at small airports or narrow docks, are often impractical if not impossible.

Another complicating factor is that the variable platform may be moving. For instance, as the tides rise and fall the level of a ship changes with respect to the ship terminal, causing excessive slopes. In addition to the shipping industry, with the increasing size of airplanes, the variances in sizes of airplanes requires excessive slopes to connect the fixed platform (airport terminal) to the variety of planes without creating excessively long tunnels, which are impractical in airports.

Therefore, a need has arisen for a new method and apparatus for adjusting the tilt of a passenger boarding bridge that overcomes the disadvantages and deficiencies of the prior art.

SUMMARY OF THE INVENTION

An apparatus for variably elevating a passenger boarding bridge platform is disclosed. The apparatus includes a tunnel having a pivoting end adjacent a fixed platform and a free end adjacent a variable platform. The tunnel also has a ceiling and a floor. The apparatus also includes a lift for raising and lowering the tunnel. The free end of the tunnel is moved vertically by a tilt mechanism, which has two ends. A cradle is connected to the lift and to one end of the tilt mechanism. The apparatus also includes a guide structure aligning the cradle and a plurality of guidepads adjacent the guide structure fixed to the tunnel solely at the ceiling for aligning the tunnel, leaving the floor to move freely with respect to the guide structure.

In another embodiment, a method for variably elevating a passenger boarding bridge platform is provided. The method includes locating a tunnel having a pivoting end, a free end, a ceiling, and a floor, between a fixed and variable platform. The method further includes surrounding a portion of the tunnel with a guide structure and providing a plurality of guidepads proximate the tunnel ceiling to restrain motion of the tunnel with respect to the guide structure. The method also includes placing the pivoting end proximate the fixed platform and the free end proximate the variable platform and adjusting the elevation of the pivoting end to the elevation of the fixed platform. In addition the method includes moving the tunnel to position the tunnel free end to the elevation of the variable platform and permitting the floor to float freely with respect to the guide structure.

A technical advantage of the present invention is that a passenger bridge is provided that does not require excessive slopes or excessive bridge lengths. Another technical advantage is that the invention provides a method for connecting two platforms of variable elevations. Another technical advantage is that a method for adjusting the tilt of a passenger boarding bridge is provided.

BRIEF DESCRIPTION OF THE DRAWINGS

For a more complete understanding of the present invention, the objects and advantages thereof, reference is now made to the following descriptions taken in connection with the accompanying drawings in which:

FIG. 3 shows an enlarged end view of the cradle and lift and tilt supports shown in FIG. 2.

FIG. 4A–4C show a plan view and two end views of the cradle shown in FIG. 3.

DETAILED DESCRIPTION OF THE INVENTION

The preferred embodiment of the present invention and its advantages are best understood by referring to FIGS. 1 through 5 of the drawings, like numerals being used for like and corresponding parts of the various drawings.

Figure 1:
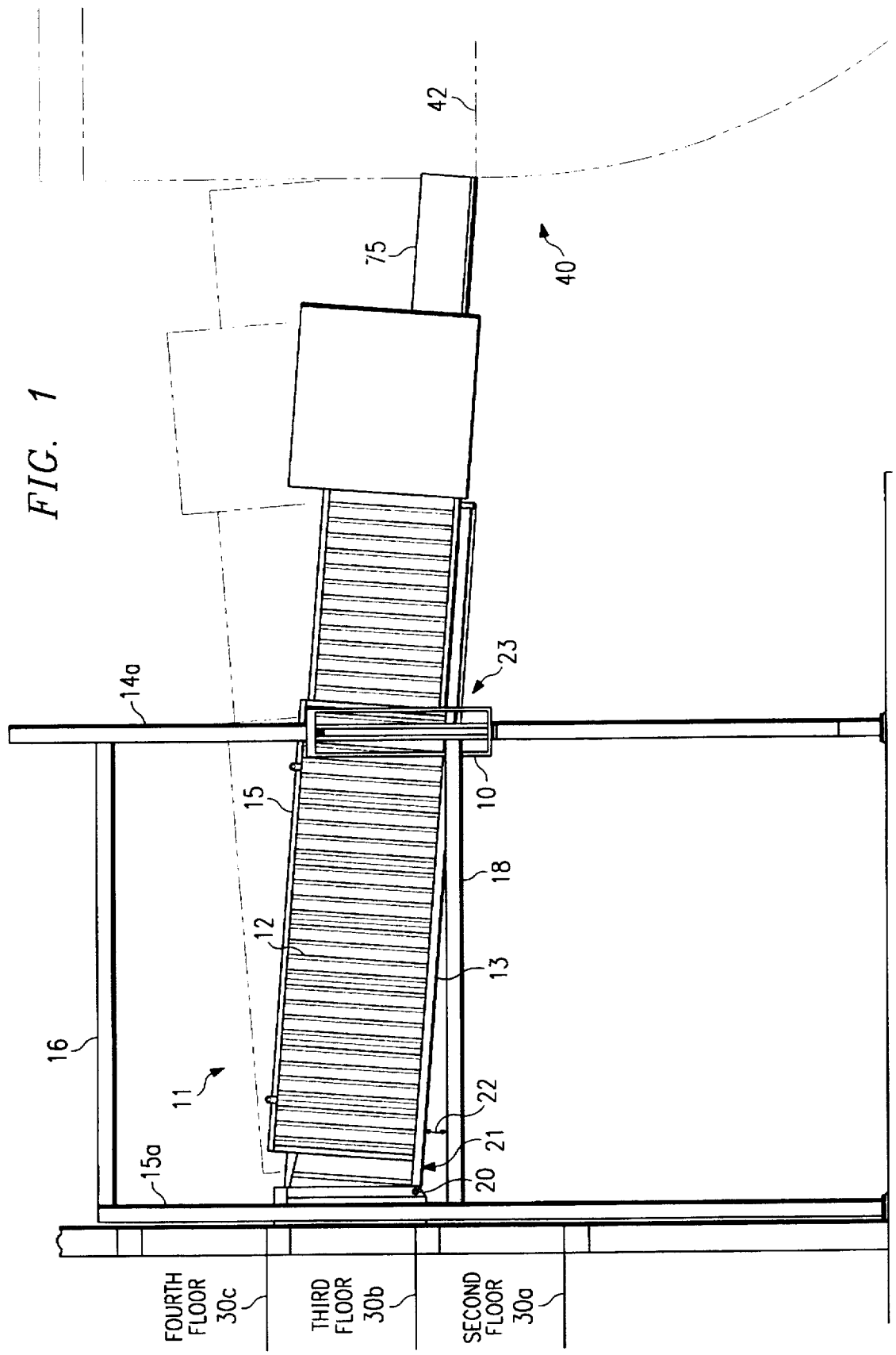
FIG. 1 illustrates the passenger bridge according to the teachings of the present invention connecting a ship's surface to one of several possible departure floors.

Referring now to FIG. 1, a passenger boarding bridge 8 is illustrated. Passenger boarding bridge 8 includes a walkway or tunnel 11 over which passengers can walk to reach the surface 42 of a ship 50 from the terminal 7. The tunnel 11 includes a cab 40, which is an expanded platform at the ship end or free end 52 of the tunnel 11, and is used to connect the tunnel to the ship's surface 42 through gangway 75. The tunnel 11 may be telescoping so that it has an adjustable length that may accommodate varying distances between the ship's surface 42 and the terminal 7.

Terminal 7 includes three departure floors or fixed platforms 30a, 30b, and 30c from which passengers may depart the terminal. Although three departure floors are shown, more or less departure floors could be used without departing from the teachings of the present invention. Tunnel 11 is positionable, as discussed in more detail below, at any one of the departure floors, depending upon the elevation of the ship's surface 42. Tunnel 11 may also pivot about pivot point 20 near a pivot end 21 of the tunnel to accommodate minor differences in elevations between the ship's surface 42 and the free end 52 of the tunnel. When tunnel 11 pivots about pivot point 20 an inclination angle 22 is created. To remain within industry standards, angle 22 should be such that the tunnel has a maximum slope of plus or minus 10%. Pivot point 20 is on a fixed house 48, which is part of the tunnel and is elevated with the tunnel from floor to floor, but remains stationary during pivoting of tunnel 11. As shown in FIG. 1, the pivot end 21 provides an entrance or exit at the terminal 7.

Tunnel 11 preferably is enclosed with a ceiling or topside 15 and sidewalls 12 to protect passengers from the elements and to prevent passengers from falling off the tunnel. Tunnel 11 also includes a floor 13 over which passengers may walk.

At the pivot end of the tunnel is a support 17a, 17b (not shown). This support helps guide motion of the pivot end 21 of the tunnel 11 to and from the multiple departure floors 30a, 30b, and 30c. A guide structure 14a and 14b (not shown) is placed at a point along the length of the tunnel as shown in FIG. 1, which guides the motion of the tunnel 11 near a cradle 10, which will be described in further detail below. Guide structure 14a, 14b is at the approximate midspan of the tunnel when the tunnel is fully extended. Guide structure 14a, 14b, and support 17a, 17b may be I-beam structures. Connecting the guide structure 14a, 14b and support 17a, 17b are upper 16 and lower 18 connecting beams.

Figure 2:
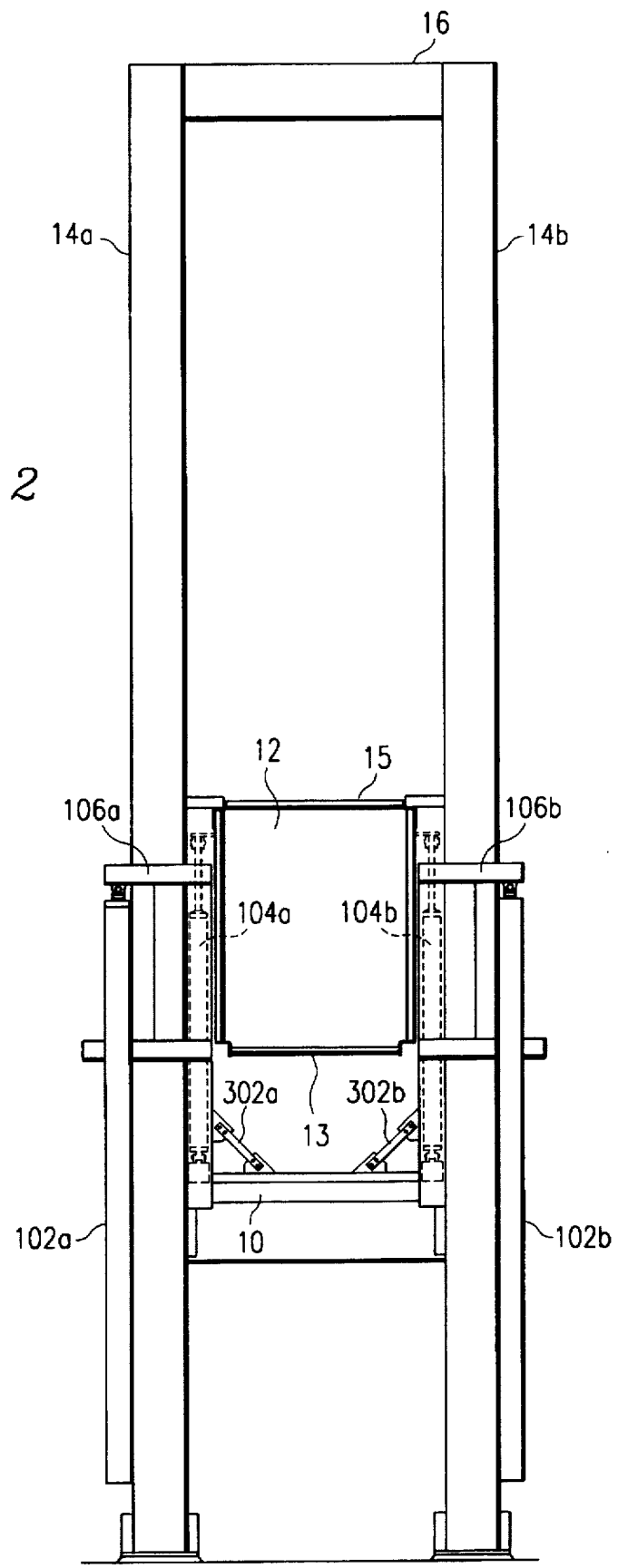
FIG. 2 illustrates an end view of the passenger bridge shown in FIG. 1, showing a cradle, lift supports, and tilt supports.

Referring now to FIG. 2, an end view of the passenger boarding bridge 8 is shown from a view looking from the ship. Supporting the tunnel 11 at the guide structure 14a and 14b are two tilt mechanisms for raising and lowering a free end 52 of tunnel 11. In the embodiment illustrated in FIGS. 1–5, the two tilt mechanisms are hydraulic tilt cylinders 104a and 104b, which are connected to the tunnel as shown more clearly in FIG. 3. Connected to and supporting tilt cylinders 104a and 104b is the cradle 10. Cradle 10 is supported by two hydraulic lift cylinders 102a and 102b. Lift cylinders 102a and 102b are connected to the cradle 10, as more clearly shown in FIG. 3, through connection arms 106a and 106b of cradle 10. In one embodiment of the present invention, the lift cylinders are 20 foot stroke cylinders mounted on the outside of the guide structure and the tilt cylinders are 6 foot stroke cylinders mounted on the inside of the guide structure, as shown in FIG. 2. At the pivot end 21, two hydraulic lift cylinders 103a and 103b (not shown) similar to lift cylinders 102a and 102b support the tunnel 11 through attachment to fixed house 48.

In FIG. 3 an enlarged view of the lift cylinders 102a, 102b, the tilt cylinders 104a, 104b, and the cradle 10 is shown. Tilt cylinders 104a, 104b connect to and support the tunnel 11 near the top side 15 through connections 208a and 208b. In this embodiment, except for the support of the lift cylinders at the pivot end, the tunnel 11 is directly supported only through tilt cylinders 104a and 104b. The tilt cylinders are connected to and supported by the cradle 10 through tilt connections 604a and 604b. Coupling the cradle 10 to the hydraulic lift cylinders 102a and 102b are lift connection points 304a and 304b, which are attached to connection arms 106a and 106b of cradle 10.

In FIG. 4 a plan view and two end views of the cradle 10 prior to attachment of the tilt cylinders 104a, 104b and the lift cylinders 102a, 102b are shown. As can be seen in FIG. 4, cradle 10 may be a generally parallelepiped structure, having rectangular cross sections. Tilt connection points 604a and 604b, are provided at the approximate center of each side of the cradle for connection with, and support of, tilt cylinders 104a and 104b. These tilt cylinders are positioned interior of guide structure 14a and 14b, as shown in FIG. 2. Similarly, lift connection points 304a and 304b, are provided on the lower surface of connection arms 106a and 106b of cradle 10 for connection with and support of, lift cylinders 102a and 102b. Attachment of lift cylinders 102a and 102b to connections 304a and 304b of connection arms 106a and 106b allows placement of the lift cylinders exterior the guide structure 14a and 14b.

Because cradle 10 supports a significant portion of the weight of the tunnel 11, it should be manufactured with sufficient strength and material integrity. The cradle may be generally comprised of steel I-beam structures. As shown in FIG. 4, cradle 10 includes support brackets 302a and 302b, which provide structural strength to the cradle. Cradle 10 also includes middle cross bracing plate 602a and 602b. In addition, the cradle may be precambered so that it will remain square once it is loaded with the weight of tunnel 11 through tilt cylinders 104a and 104b.

Multiple guidepads and rollers (not shown) may be used to restrain the cradle with respect to the guide structure 14a and 14b. The guidepads may be constructed of ultra high molecular weight polymer or plastic material. An ultra high molecular weight guidepad absorbs the load on the cradle and provide a smooth surface to prevent marring of the paint on the guide structure.

Figure 5A:
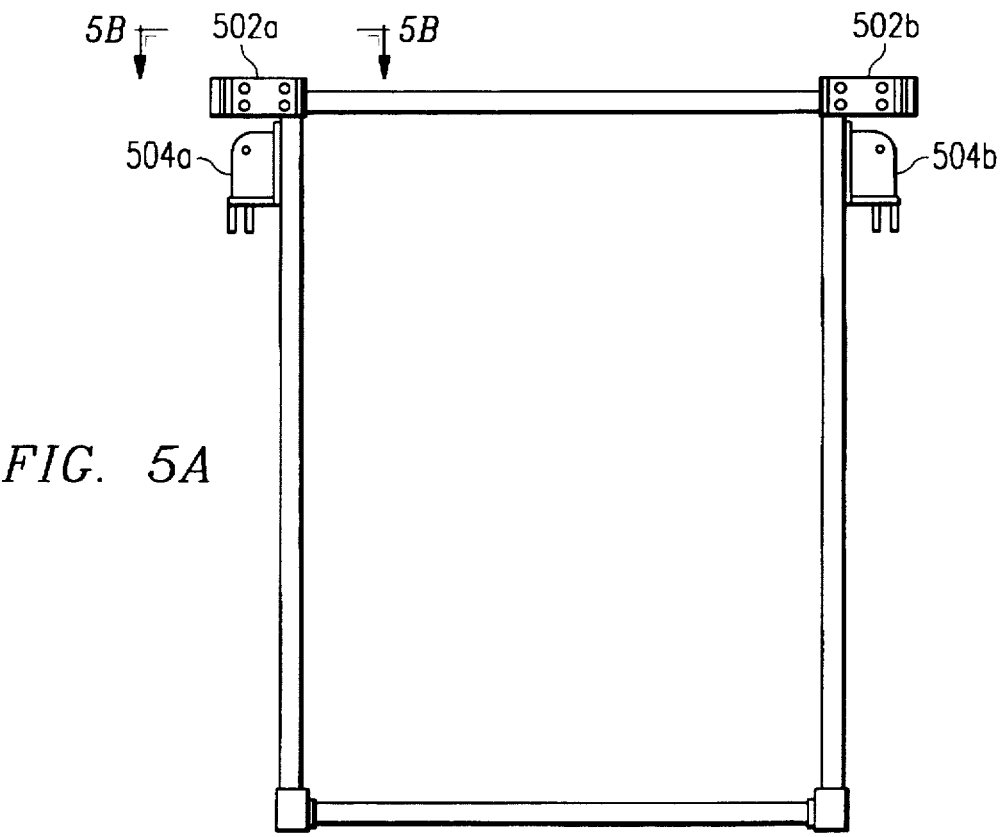
FIG. 5A shows an end view of the tunnel illustrated in FIG. 1 together with guidepads on the tunnel.
Figure 5B:
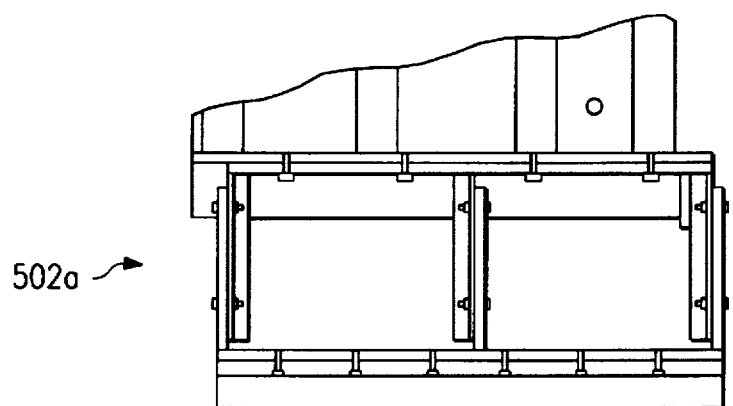
FIG. 5B shows a top view of the guidepads illustrated in FIG. 5A.

In addition, as shown in FIGS. 5A and 5B, in order to restrain motion of the tunnel the passenger tunnel 11 includes guide pads 502a, 502b, near the ceiling 15 of the tunnel for engagement with guide structure 14a and 14b. During elevation or tilting, the tunnel 11 may have a tendency to move to the side, toward either guide structure 14a or 14b. Therefore, guidepads are provided on the tunnel 11 to resist this motion. Guidepads 502a, 502b resist motion in the direction of a plane connecting guide structures 14a and 14b. No guidepads or similar devices are connected to the tunnel near the floor 13 of tunnel 11. This allows the tunnel to be restrained with respect to guide structures 14a and 14b by only the guidepads 502a, 502b, thus allowing the floor 13 of the tunnel 11 to be free floating with respect to guide structure 14a and 14b. As with the guidepads associated with the cradle 10, the guidepads 502 may be ultra high molecular weight guidepads.

Guidepads (not shown) may also be placed approximately midway between the ceiling 15 and floor 13 on the tunnel 11 proximate the pivot end 21 for engagement with support 17a and 17b.

Also shown in FIGS. 5a and 5b are connection points 504a and 504b formed on tunnel 11, which are a part of connections 208a and 208b between the tunnel 11 and tilt cylinders 104a and 104b (FIG. 3).

Referring now to FIGS. 1–5, the operation of the passenger boarding bridge 8 will be described. When a ship 50 arrives at the terminal 7, the tunnel 11 is raised to the floor level 30a, 30b, or 30c, closest to the elevation of the ship surface 42. The tunnel 11 is raised or lowered through extension or retraction of hydraulic lift cylinders 102a and 102b adjacent guide support 14a and 14b, and through extension of lift cylinders 103a and 103b connected to the fixed house 48 at the pivot end of the tunnel and adjacent support 17a and 17b.

Adjacent guide structure 14a, 14b, the lift cylinders 102a and 102b do not directly contact the tunnel. Rather, the lift cylinders 102a and 102b raise the elevation of the cradle 10 through connection arms 106a and 106b (FIG. 3). Raising cradle 10 in turn elevates tilt cylinders 104a, 104b, which are directly connected to tunnel 11 near the ceiling 15 at connections 208a and 208b. Sensors may be used to detect when the tunnel has been elevated to the correct floor. Proximity sensors are appropriate for this purpose, although other sensors well known in the art may also be used. Although in the embodiment shown in FIGS. 1–5, lift cylinders 103a and 103b lift tunnel 11, without the use of a cradle or tilt cylinders, the use of a cradle and a pair of tilt cylinders in connection with elevating the pivot end 21 is within the teachings of the present invention.

Elevating the tunnel in this manner requires a free travel zone for the vertical motion of the cradle. Without such a free travel zone, the tunnel could destroy any structure along the vertical path of the tunnel. In order to provide such a free travel zone, all structures must be place outside the vertical path of tunnel 11. For example, some boltheads may be recessed to avoid interference with the elevating tunnel 11.

Once the tunnel 11 is at the proper floor, the tunnel 11 is tilted to accommodate variations in elevations between the free end 52 and the ship's surface 42. Tilting of tunnel 11 is accomplished through expansion or contraction of tilt cylinders 104a and 104b. With the lift cylinders 102a, 102b and 103a, 103b stationary, the tilt cylinders 104a and 104b are raised or lowered thereby adjusting the elevation of the free end 52 of the tunnel 11 and the elevation of the cab 40. While the elevation of the ship end 52 is adjusted, the tunnel 11 pivots about pivot point 20, thereby changing inclination angle 22. As inclination angle 22 increases or decreases, tilt cylinders 104a and 104b pivot about connection points 604a and 604b, thereby maintaining the tilt cylinders 104a and 104b in an orientation approximately perpendicular to the ceiling 15 of the tunnel 11 during tilting of the tunnel. The inclination angle 22 is adjusted until the cab 40 and the ship's surface 42 are at close to the same elevations. The two are then connected via a free-floating gangway 75. In this manner, the passenger boarding bridge can be adjusted to connect ships of various heights to the terminal 7 without excessive inclination angles and without excessively long bridges.

As the tunnel 11 is either elevated or tilted, it may have a tendency to move in a direction along the axis connecting guide structure 14a and 14b. As discussed above, guidepads 502a, 502b on the tunnel 11 near ceiling 15 engage with guide structure 14a and 14b to restrict this motion. Guidepads may also be provided on the tunnel 11 for engagement with support 17a and 17b.

As discussed above, the tunnel 11 may be a telescoping or extensible tunnel. Its length may be adjusted prior to, during, or after any of the elevating or tilting steps so that the passenger bridge 8 connects any desired floor 30a, 30b, and 30c of terminal 7 to the ship's surface 42.

When tides raise or lower the level of the ship surface 42, a control system may be used to automatically adjust the tilt of the tunnel and elevation of the free end 52 as needed to keep the gangway 75 in contact with both the ship's surface 42 and the cab 40. The control system automatically actuates the tilt cylinders to expand or retract as necessary to maintain an appropriate elevation of free end 52 and cab 40.

Although the invention has been particularly shown and described by the foregoing detailed description, it will be understood by those skilled in the art that various other changes in form and detail may be made without departing from the spirit and scope of the invention.

What is claimed is:

1. An apparatus for variably elevating a passenger boarding bridge platform comprising:

a tunnel having a pivoting end adjacent a fixed platform and a free end adjacent a variable platform, the tunnel further having a ceiling and a floor;

a plurality of lifts for raising and lowering both ends of the tunnel;

a tilt mechanism for raising and lowering the free end of the tunnel relative to at least one of the lifts;

a cradle connected to at least one of the lifts and the tilt mechanism;

a guide structure for aligning the cradle; and a plurality of guidepads adjacent the guide structure fixed to the tunnel solely at the ceiling for aligning the tunnel such that the floor moves freely with respect to the guide structure.

2. The apparatus of claim 1 wherein the plurality of lifts comprises at least one hydraulic cylinder having a connection with the tunnel at the pivoting end and supporting the tunnel.

3. The apparatus of claim 2 wherein the plurality of lifts further comprises at least one hydraulic cylinder supporting the tilt mechanism.

4. The apparatus of claim 1 wherein the cradle is supported by at least one of the plurality of lifts.

5. The apparatus of claim 1 wherein the tunnel is an extensible tunnel.

6. The apparatus of claim 5 wherein the lift comprises at least one hydraulic cylinder positioned from the pivot point at least two-fifths of the fully extended length of the tunnel.

7. An apparatus for variably elevating a passenger boarding bridge platform comprising:

a tunnel having a pivoting end and a free end, the tunnel further having a ceiling and an unrestrained floor;

a plurality of hydraulic lift cylinders for lifting both ends of the tunnel;

a hydraulic tilt cylinder for lifting the free end relative to at least one of the hydraulic lift cylinders;

a cradle supporting the tilt cylinders, the cradle connected to at least one of the lift cylinders;

a guide structure for aligning the motion of the tunnel and the cradle; and a plurality of guidepads attached to the tunnel solely proximate the ceiling for engagement with the guide structure.

8. The apparatus of claim 7 wherein the tunnel is an extensible tunnel.

9. The apparatus of claim 8 wherein one of the hydraulic lift cylinders is positioned at approximately the midspan of the tunnel when the tunnel is fully extended.

10. The apparatus of claim 7 wherein the cradle comprises a parallelepiped structure having two lift connection points for connecting the hydraulic lift cylinders to the cradle and a tilt connection point for connecting the tilt cylinder to the cradle.

11. The apparatus of claim 7 wherein the lift cylinders comprise long stroke cylinders.

12. An apparatus for variably elevating a passenger boarding bridge platform comprising:

a tunnel having a pivoting end adjacent a fixed platform and a free end adjacent a variable platform, the tunnel further having a ceiling and a floor;

a lift for raising and lowering the tunnel;

a tilt mechanism for raising and lowering the free end of the tunnel, the tilt mechanism having a first end;

a cradle connected to the lift and the first end of the tilt mechanism;

a guide structure for aligning the cradle;

a plurality of guidepads adjacent the guide structure fixed to the tunnel solely at the ceiling for aligning the tunnel such that the floor moves freely with respect to the guide structure; and wherein the tilt mechanism comprises at least one hydraulic tilt cylinder.

13. An apparatus for variably elevating a passenger boarding bridge platform comprising:

a tunnel having a pivoting end and a free end, the tunnel further having a ceiling and an unrestrained floor;

a plurality of hydraulic lift cylinders for lifting both ends the tunnel;

a hydraulic tilt cylinder for lifting the free end;

a cradle supporting the hydraulic tilt cylinder, said cradle connected to at least one of the hydraulic lift cylinders, said cradle having a tilt connection point connecting the tilt cylinder to the cradle;

a guide structure for aligning the motion of the tunnel and the cradle;

a plurality of guidepads attached to the tunnel solely proximate the ceiling for engagement with the guide structure; and wherein the hydraulic tilt cylinder is pivotal about the tilt connection point to accommodate pivoting of the walkway.

* * * * *